US010846889B2

(12) United States Patent
Phogat et al.

(10) Patent No.: US 10,846,889 B2
(45) Date of Patent: Nov. 24, 2020

(54) COLOR HANDLE GENERATION FOR DIGITAL IMAGE COLOR GRADIENTS USING MACHINE LEARNING

(71) Applicant: Adobe Inc., San Jose, CA (US)

(72) Inventors: Ankit Phogat, Noida (IN); Vineet Batra, Pitam Pura (IN); Mridul Kavidayal, Nainital (IN)

(73) Assignee: Adobe Inc., San Jose, CA (US)

( * ) Notice: Subject to any disclaimer, the term of this patent is extended or adjusted under 35 U.S.C. 154(b) by 12 days.

(21) Appl. No.: 16/204,871

(22) Filed: Nov. 29, 2018

(65) Prior Publication Data
US 2020/0175727 A1 Jun. 4, 2020

(51) Int. Cl.
*G06T 7/90* (2017.01)
*G06T 11/00* (2006.01)
*G06K 9/62* (2006.01)
*G06F 3/0484* (2013.01)

(52) U.S. Cl.
CPC .......... *G06T 11/001* (2013.01); *G06K 9/6257* (2013.01); *G06T 7/90* (2017.01); *G06F 3/04845* (2013.01); *G06T 2200/24* (2013.01); *G06T 2207/20081* (2013.01); *G06T 2207/20084* (2013.01)

(58) Field of Classification Search
CPC ...................... G06T 11/001; G06T 7/90; G06T 2207/20081; G06T 2207/20084
See application file for complete search history.

(56) References Cited

U.S. PATENT DOCUMENTS

| | | |
|---|---|---|
| 10,242,464 B1 | 3/2019 | Phogat et al. |
| 10,489,946 B1 | 11/2019 | Batra et al. |
| 2009/0213143 A1 | 8/2009 | Igarashi |
| 2012/0320063 A1 | 12/2012 | Finch et al. |
| 2013/0127856 A1 | 5/2013 | Winnemoeller et al. |
| 2018/0204337 A1 | 7/2018 | Iu |
| 2019/0087980 A1 | 3/2019 | Phogat et al. |

OTHER PUBLICATIONS

"Example-Based Color Transfer for Gradient Meshes" Xiao et al. IEEE Transactions on Multimedia, vol. 15, No. 3, Apr. 2013. pp. 549-560. (Year: 2013).*
"IEGAN: Multi-purpose Perceptual Quality Image Enhancement Using Generative Adversarial Network" Gosh et al. (2018) (Year: 2018).*
"Search Report", GB Application No. 1812210.1, dated Jan. 24, 2019, 4 pages.

(Continued)

*Primary Examiner* — Antonio A Caschera
(74) *Attorney, Agent, or Firm* — SBMC

(57) ABSTRACT

Color handles are generated based on digital image color gradients using machine learning. In order to train a neural network of a generator module of a GAN system, a training digital image is used by the neural network of the generator module to generate a candidate color handle. The discriminator module of the GAN system then compares the candidate color handle with a ground truth color handle of the training digital image using a loss function as part of machine learning, and uses a result of this comparison to train the neural network of the generator module.

20 Claims, 11 Drawing Sheets
(5 of 11 Drawing Sheet(s) Filed in Color)

(56) References Cited

OTHER PUBLICATIONS

Wan,"Scribble-based Gradient Mesh Recoloring", IET Multimedia Tools and Applications, vol. 77, Issue 11, Jun. 2018, 18 pages.
"Diffusion Coloring Using Weighted Color Points", U.S. Appl. No. 16/023,521, filed Sep. 18, 2018, Sep. 18, 2017, 27 pages.
Arjovsky,"Wasserstein GAN", In Proceedings of the 34th International Conference on Machine Learning, ICML 2017, Mar. 9, 2017, 32 pages.
Batra,"Generalized Primitives for Smooth Coloring of Vector Graphics Artwork in Constant Time", U.S. Appl. No. 16/023,521, filed Jun. 29, 2018, 61 pages.
Cohen-Or,"Color Harmonization", Jul. 2006, 7 pages.
Gulrajani,"Improved Training of Wasserstein GANs", Dec. 25, 2017, 20 pages.
He,"Deep Residual Learning for Image Recognition", Proceedings of the IEEE conference on computer vision and pattern recognition, 2016., Dec. 10, 2015, 12 pages.
Isola,"Image-to-Image Translation with Conditional Adversarial Networks", 2017 IEEE Conference on Computer Vision and Pattern Recognition (CVPR), Nov. 22, 2017, 17 pages.
Jacobson,"Bounded Biharmonic Weights for Real-Time Deformation", In ACM SIGGRAPH 2011 Papers, SIGGRAPH '11, Jul. 2011, 8 pages.
Orzan,"Diffusion Curves: A Vector Representation for Smooth-Shaded Images", ACM Transactions on Graphics (TOG)—Proceedings of ACM SIGGRAPH; vol. 27 Issue 3, Aug. 2008, 8 pages.
Ronneberger,"U-Net: Convolutional Networks for Biomedical Image Segmentation", May 18, 2015, 8 pages.
Sangkloy,"Scribbler: Controlling Deep Image Synthesis with Sketch and Color", Computer Vision and Pattern Recognition, CVPR, 2017., Dec. 5, 2016, 13 pages.
Sun,"Diffusion Curve Textures for Resolution Independent Texture Mapping", Jul. 2012, 9 pages.
Yan,"K-Curves: Interpolation at Local Maximum Curvature", Jul. 2017, 7 pages.
"Pre-Interview First Office Action", U.S. Appl. No. 15/707,212, dated Jun. 1, 2018, 4 pages.
"First Action Interview Office Action", U.S. Appl. No. 15/707,212, dated Jul. 13, 2018, 4 pages.
"Notice of Allowance", U.S. Appl. No. 15/707,212, dated Oct. 25, 2018, 9 pages.
Yuksel,"Mesh Colors", Apr. 2010, 11 pages.
"Notice of Allowance", U.S. Appl. No. 16/023,521, dated Aug. 28, 2019, 12 pages.
"Pre-Interview First Office Action", U.S. Appl. No. 16/023,521, dated Jul. 23, 2019, 4 pages.

* cited by examiner

COLOR HANDLE GENERATION FOR DIGITAL IMAGE COLOR GRADIENTS USING MACHINE LEARNING

BACKGROUND

Image processing systems may be used to generate a wide range of digital images. Once example involves vector graphics, which are defined mathematically in terms of points that are connected by lines and curves to form polygons and other shapes as part of a mesh. This enables vector graphics to be resized by the image processing system to maintain smooth lines when rendered as part of a digital image by a computing device.

Conventional techniques used by image processing systems to color vector graphics include solid fills or gradients. Solid fills are used by the image processing system to specify colors that do not change for a particular portion (e.g., polygon) of the vector graphic. Gradients, on the other hand, specify changes to amounts of a color. Gradients may be defined in variety of ways, examples of which include linear, radial, and freeform. Linear gradients are used by the image processing system to blend color from one point to another in the mesh in a straight line. Radial gradients are used by the image processing system to blend colors from one point to another in the mesh in a circular pattern. Freeform gradients are used by the image processing system to create a graduated blend of colors within an shape in an ordered or random sequence such that the blending appears smooth and natural.

Conventional techniques used to generate color gradients by the image processing system, however, rely on manual interaction of a user to specify color handles that are used as a basis to define the gradient as well as colors associated with those color handles. The color handles, for instance, define locations in the mesh, from which, an associated color is to diffuse based on weights to control an amount of the color at respective vertices in the mesh to form the color gradient, e.g., a linear, radial, or freeform color gradient.

This manual interaction with the image processing system, however, is not intuitive and relies on the user to manually specify color handles and colors for those handles that is consistent with other artwork already included in the digital image. The digital image, for instance, may already include vector graphics having color gradients. Therefore, in order to generate another vector graphic in the digital image that is visually similar and consistent, the user is tasked with manually determining a location of color handles as well as colors associated with those color handles. This may be especially difficult for complex color gradients that are formed using a multitude of color handles and colors. Accordingly, conventional techniques may result in inefficient user interaction with the image processing system as well as computational inefficiencies resulting from repeated manual user interactions to achieve a desired result.

SUMMARY

Techniques and systems are described for color handle generation for digital image color gradients using machine learning. These techniques overcome the limitations of conventional image processing systems that require manual interaction to specify color handles and locations of color handles to generate gradients through use of machine learning. To do so, a neural network is trained using a generative adversarial network (GAN) system. The GAN system is employed to train a generator module of GAN system to generate candidate color handles in a manner that is considered "real" by a discriminator module of the GAN system.

In order to train a neural network of the generator module, a training digital image is used by the neural network of the generator module to generate a candidate color handle. The candidate color handle, for instance, may be generated based on a shape of an outer path of a portion of training digital image. The discriminator module of the GAN system then compares the candidate color handle with a ground truth color handle of the training digital image using a loss function as part of machine learning, and uses a result of this comparison to train the neural network of the generator module. A variety of loss functions may be employed, examples of which include pixel loss, adversarial loss, and perceptual loss. In this way, the neural network may be trained for accurate location of color handles through use of back-and-forth communication between the generator module and the discriminator module of the GAN system.

The neural network, once trained, is then used by the gradient module to generate a color gradient for an input digital image, automatically and without user intervention. A user input, for instance, may be received that specifies a portion of the input digital image that is to be colored using a color gradient, e.g., as a freeform line, a bounding box, and so forth. In response, the trained neural network is used to generate at least one color handle, automatically and without user intervention, that serves as a basis to define color diffusion within the digital image for that portion of the digital image.

The generated color handle is also used by a color selection module to select a color that is associated with the color handle. The color may be selected by the color selection module in a variety of ways, e.g., using color harmonization, from colors sampled from the digital image by rasterizing the digital image and generating a color palette, and so forth. The color handle and selected color are then used by a gradient rendering module to render the color gradient within the portion of the digital image. Further discussion of these and other examples is included in the following sections and shown in corresponding figures in the Detailed Description.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The patent or application file contains at least one drawing executed in color. Copies of this patent or patent application publication with color drawing(s) will be provided by the Office upon request and payment of the necessary fee. The detailed description is described with reference to the accompanying figures. Entities represented in the figures may be indicative of one or more entities and thus reference may be made interchangeably to single or plural forms of the entities in the discussion.

DETAILED DESCRIPTION

Overview

Figure 1:
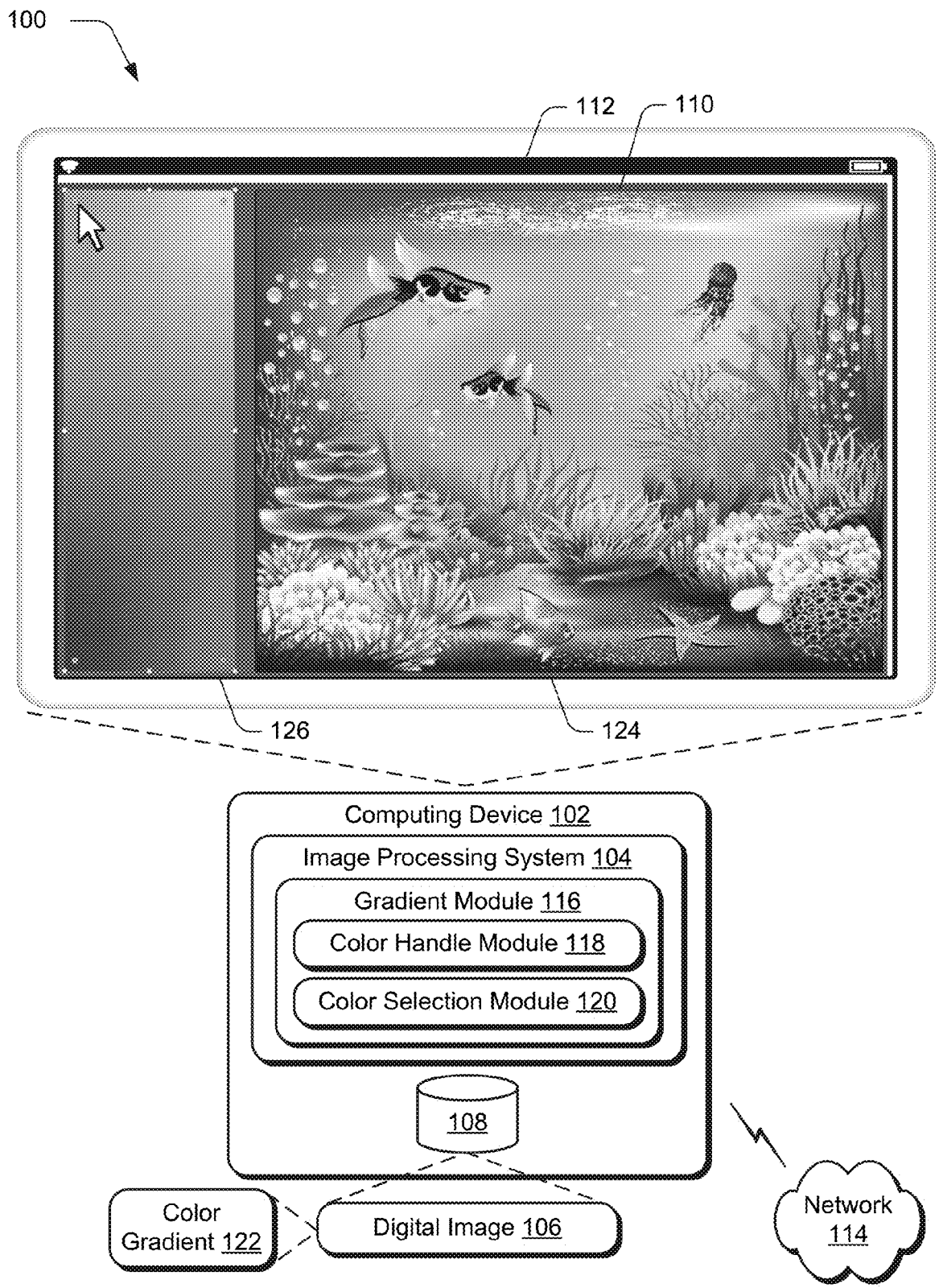
FIG. 1 is an illustration of a digital medium environment in an example implementation that is operable to employ color handle generation techniques for digital image color gradients using machine learning described herein.

Conventional techniques used by image processing systems to color vector graphics using color gradients require manual user interaction to specify location of color handles as well as colors of those handles. Thus, these techniques are challenging to users of conventional image processing systems when confronted with manual creation of a color gradient in a digital image that is visually consistent with other color gradients that may already be included in the digital image. This includes both in where to specify locations of color handles as well as which colors are to be associated with those handles.

Accordingly, techniques and systems are described for color handle generation for digital image color gradients using machine learning. To do so, a neural network is trained using a generative adversarial network (GAN) system. GAN systems employ a type of machine learning that includes a generator module and a discriminator module as implemented by a computing device. The generator module is configured to generate candidates that are then evaluated by the discriminator module, e.g., to determine whether the candidates are real or fake. A goal of the generator module is therefore to generate a candidate that is considered real by the discriminator module, e.g., through comparison to a ground truth. Accordingly, the generator module is trained as part of adversarial back-and-forth communication between the generative and discriminator modules in order to generate "real" candidates.

In the techniques described herein, the GAN system is employed by a gradient module to train a neural network of the generator module to generate candidate color handles in a manner that is considered "real" by a discriminator module of the GAN system. To do so, the generator module of the GAN system receives a training digital image. The training digital image is used by a neural network of the generator module of the GAN system to generate a candidate color handle. The discriminator module of the GAN system then compares the candidate color handle with the ground truth color handle using a loss function as part of machine learning, and uses a result of this comparison to train the neural network of the generator module. A variety of loss functions may be employed, examples of which include pixel loss, adversarial loss, and perceptual loss. In this way, the neural network may be trained for accurate location of color handles through use of back-and-forth communication between the generator module and the discriminator module of the GAN system.

The neural network, once trained, is then used by the gradient module to generate a color gradient for an input digital image, automatically and without user intervention, based on the input digital image. A user input, for instance, may be received that specifies a portion of the input digital image that is to be colored using a color gradient, e.g., as a freeform line, a bounding box, and so forth. In response, the trained neural network is used to generate at least one color handle, automatically and without user intervention, that serves as a basis to define color diffusion within a mesh of the digital image for that portion of the digital image. The color handle, for instance, may be generated based on an outer shape of the portion using the neural network.

The generated color handle is also used by a color selection module to select a color that is associated with the color handle. The color may be selected by the color selection module in a variety of ways, e.g., using color harmonization, from colors sampled from the digital image by rasterizing the digital image and generating a color palette, and so forth.

The color handle and selected color are then used by a gradient rendering module of the gradient module to render the color gradient within the portion of the digital image. The color handle, for instance, may be used to define weights in a mesh of the digital image that specify amounts of the selected color to be applied at respective vertices to render the color gradient. In this way, the gradient module may output the color gradient automatically and without user intervention in real time as the user input is received that is visually consistent with the digital image. Subsequent user inputs may then be received involving a change of location of the color handles and/or selected colors. As such, the image processing system may generate the color gradient as a starting point to improve user and computational efficiency with color gradient functionality of an image editing system. Further discussion of these and other examples is included in the following sections and shown in corresponding figures.

In the following discussion, an example environment is first described that may employ the techniques described herein. Example procedures are described which may be performed in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ color handle generation techniques for digital image color gradients using machine learning as described herein. The illustrated environment 100 includes a computing device 102, which may be configured in a variety of ways.

The computing device 102, for instance, may be configured as a desktop computer, a laptop computer, a mobile device (e.g., assuming a handheld configuration such as a tablet or mobile phone as illustrated), and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices, such as multiple servers utilized by a business to perform operations "over the cloud" as described in FIG. 11.

The computing device 102 is illustrated as including an image processing system 104. The image processing system 104 is implemented at least partially in hardware of the computing device 102 to process and transform a digital image 106, which is illustrated as maintained in a storage device 108 (e.g., computer-readable storage medium) of the computing device 102. Such processing includes creation of the digital image 106, modification of the digital image 106, and rendering of the digital image 106 in a user interface 110 for output, e.g., by a display device 112. Although illustrated as implemented locally at the computing device 102, functionality of the image processing system 104 may also be implemented as whole or part via functionality available via the network 114, such as part of a web service or "in the cloud."

An example of functionality incorporated by the image processing system 104 to process the digital image 106 is illustrated as a gradient module 116. The gradient module 116 includes a color handle module 118 and a color selection module 120 usable to generate a color gradient 122 based on a digital image 106, automatically and without user intervention.

The gradient module 116, for instance, may receive a digital image 124, from which, a color gradient 126 is to be extracted. The color handle module 118 processes the digital image 124 to generate color handles, which are locations from which color diffuses in the color gradient 126. In a vector graphic, for instance, the color handle defines the color gradient 126 based on a location and weights from the location specifying respective amounts of a color at vertices of a mesh. The illustrated example of a color gradient 126 includes four color handles, depicted as circles at the corners of the color gradient 126 rendered in the user interface 110 by the display device 112.

The color selection module 120 is employed by the gradient module 116 to select colors from the digital image 124 for respective color handles. The color may be selected by the color selection module 120 in a variety of ways, e.g., using color harmonization, from colors sampled from the digital image by rasterizing the digital image and generating a color palette, and so forth. The color handles generated by the color handle module 118 and selected colors from the color selection module 120 are then used by the gradient module 116 to render the color gradient 126, e.g., in the user interface 110, as printed, and so forth. In this way, the color gradient 126 may be generated automatically and without user intervention to aide user interaction with gradient creation based on the digital image 124. The gradient module 116, for instance, may support subsequent user inputs to change the color handles (e.g., locations of the color handles with respect to the digital image 124 or other color handles) and/or colors associated with the color handles.

In the following discussion, a first section describes training of a neural network of the color handle module 118 to generate color handles using machine learning. A second section follows which describes use of the trained neural network by the color handle module 118 and colors selected by the color selection module 120 to generate a color gradient 122.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Color Handle Training of a Neural Network Using a GAN

Figure 2:
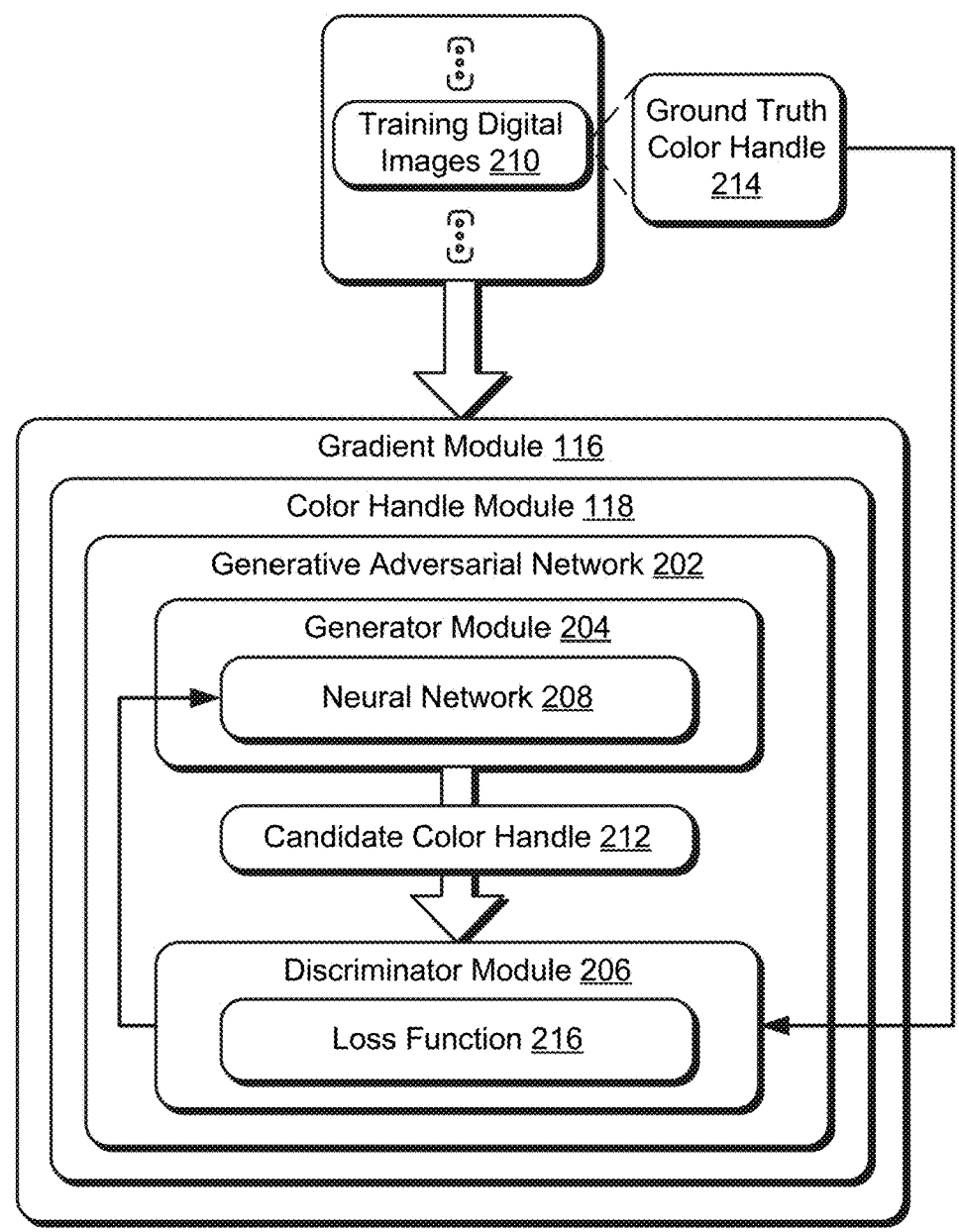
FIG. 2 depicts a system in an example implementation showing training of a neural network of a color handle module of FIG. 1 using a generative adversarial network (GAN) system.
Figure 3:
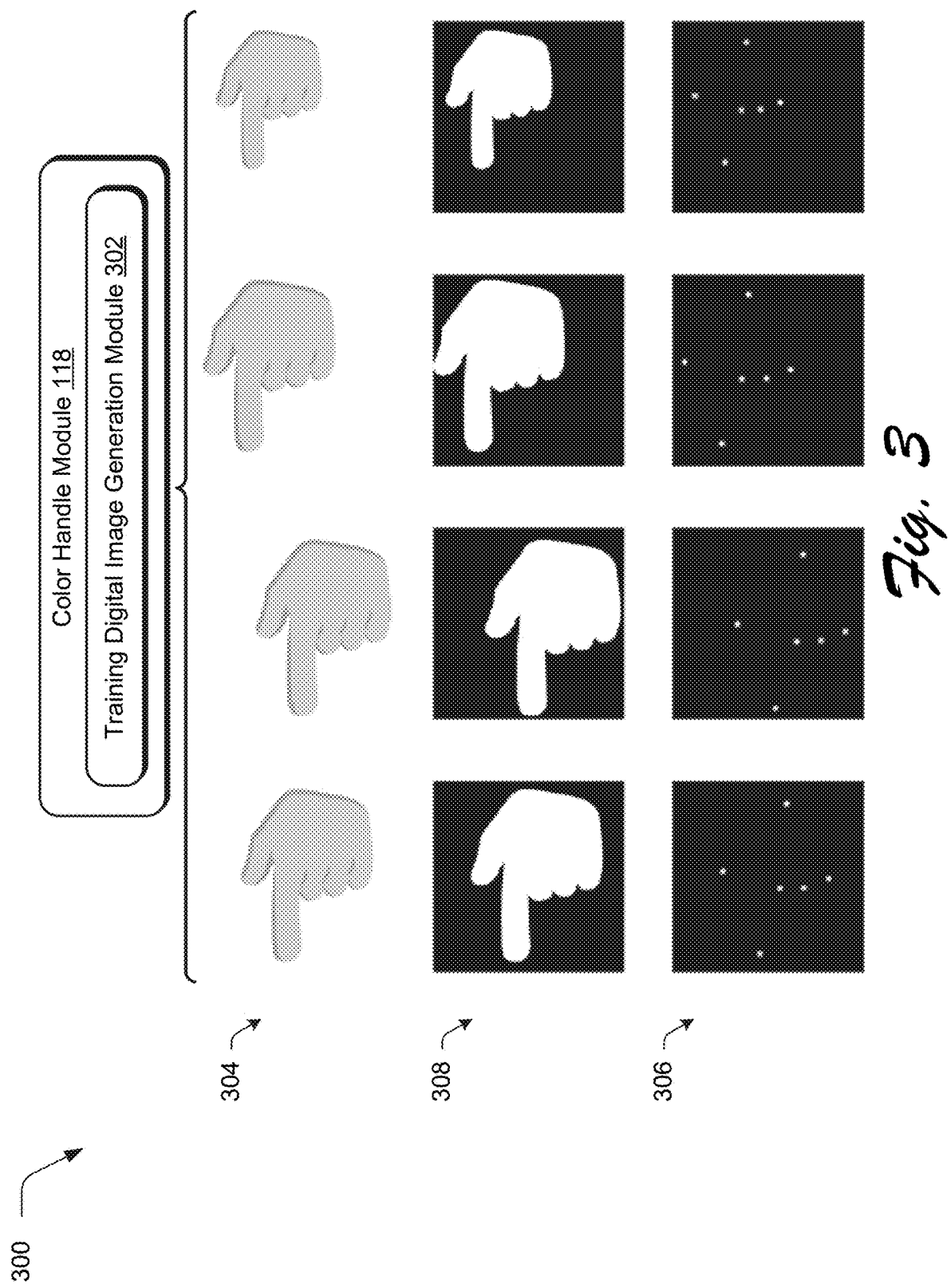
FIG. 3 depicts an example implementation of training digital images, alpha masks, and ground truth color handles.
Figure 4:
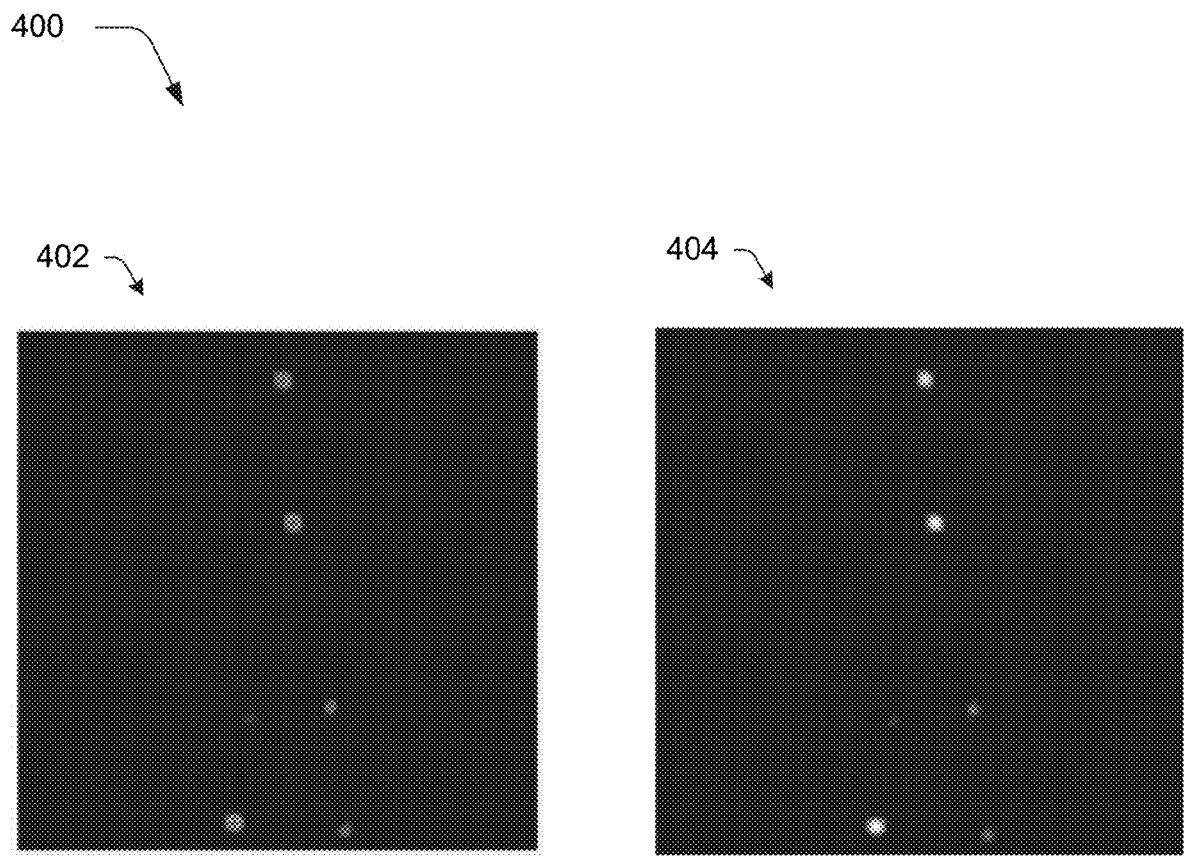
FIG. 4 depicts an example of implementation showing confidence in candidate color handle generation by the neural network of FIG. 2.
Figure 5:
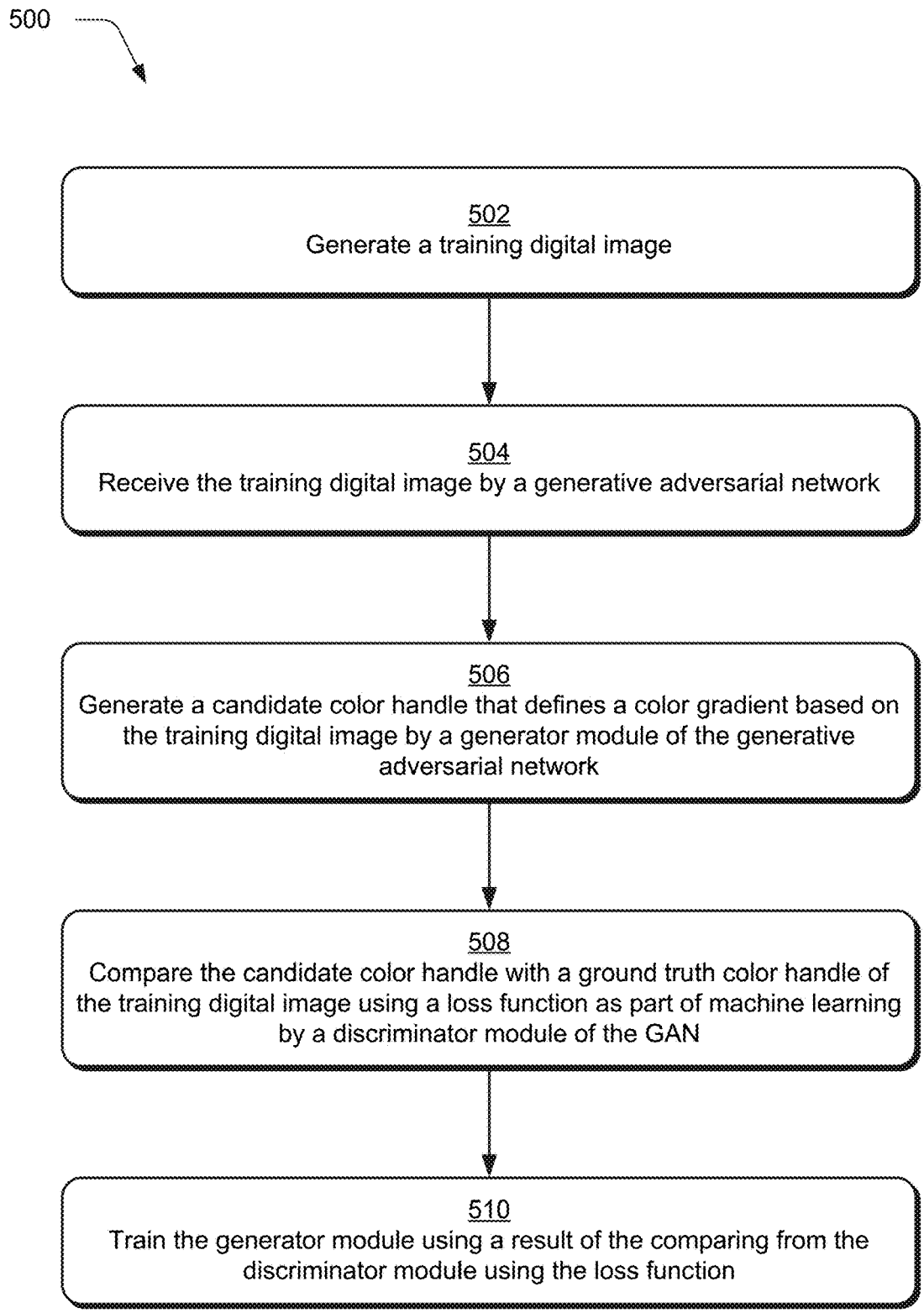
FIG. 5 is a flow diagram depicting a procedure in an example implementation in which candidate color handles generated by a neural network of a generator module of a GAN based on a training digital image are compared, by a discriminator module of the GAN, with ground truth color handles of the training digital image to train the neural network of FIG. 2.

FIG. 2 depicts a system 200 in an example implementation showing training of a neural network of a color handle module 118 of FIG. 1 using a GAN system. FIG. 3 depicts an example implementation 300 of training digital images, alpha masks, and ground truth color handles. FIG. 4 depicts an example implementation 400 showing confidence in candidate color handle generation by the neural network of FIG. 2. FIG. 5 depicts a procedure 500 in an example implementation in which candidate color handles generated by a neural network of a generator module of a GAN based on a training digital image are compared, by a discriminator module of the GAN, with ground truth color handles of the training digital image to train the neural network.

The following discussion describes techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-5.

In the illustrated example of FIG. 2, the color handle module 118 employs a generative adversarial network 202 having a generator module 204 and a discriminator module 206 to train a neural network 208 using training digital images 210. This training of the neural network 208 is performed using Deep Learning to generate a candidate color handle 212 as salient points over a geometry of a portion of a digital image (e.g., a vector graphic or artwork) that is to be colored using a color gradient. Deep learning is a type of machine learning technique that involves learning a data representation, as opposed to a task-specific algorithm of other types of machine learning techniques.

The training in this example is formulated as an image translation problem, in which, given a portion of a digital image representing an outline geometry of a path "A," generate a corresponding image marking salient points inside the outline "B" as candidate color handles 212. Thus, the salient points are used as candidate color handle 212 locations for an input geometry of the portion to be colored using the color gradient.

The generator module 204 is configured to generate the candidate color handles 212, which are then evaluated by the discriminator module 206 using a loss function 216 to determine whether the candidate color handle 212 is real or fake. Thus, a goal of the generator module 204 is to generate a candidate color handle 212 that is considered real by the discriminator module 206, e.g., through comparison to a ground truth color handle 214 of the training digital image 210. Accordingly, the neural network 208 of the generator module 204 is trained as part of adversarial back-and-forth communication between the generative and discriminator modules 204, 206 in order to generate "real" candidates.

The generative adversarial network (GAN) 202 may assume a variety of configurations. In one example, the GAN is configured as a Wasserstein Generative Adversarial Network and therefore the loss function 216 includes a Wasserstein loss, i.e., a Wasserstein distance as a measure of a distance between two probability distributions. Other examples are also contemplated.

The neural network 208 of the generator module 204 may be implemented using a variety of architectures. In one example, the neural network 208 employs an encoder/decoder architecture having the following filter arrangement:

Encoder C64-C128-C256-C512-C512-C512-C512

Decoder C512-C512-C512-C512-C256-C128-C64 where "Ck" denotes a Convolution-Layer-Norm-ELU layer with "k" filters. Each of the convolutions in the encoder may be implemented using 4×4 spatial filters applied with a stride of two and each of the deconvolutions in the decoder include bilinear upsampling followed by convolutions with 3×3 spatial filters and a stride of one. Therefore, convolutions in the encoder downsample by a factor of two and those in the decoder upsample by a factor of two.

In an implementation, the neural network employs skip connections as part of a U-Net architecture. A U-Net architecture is similar to the above architecture, but employs skip connections between each layer "i" in the encoder and layer "n i" in the encoder, where "n" is the total number of layers. The skip connections concatenate activations from layer "i" in the encoder and layer "n–i" in the decoder, which changes the number of channels in the decoder. An example of a U-Net decoder is described as follows:

U-Net Decoder C1024-C1024-C1024-C1024-C512-C256-C128

The discriminator module 206 may also be implemented using a variety of architectures. In one example, the discriminator module 206 is implemented using filter in a C64-C128-C256-C512 arrangement. Each of the convolutions employ 4×4 spatial filters applied with a stride of two in this example. Other examples are also contemplated.

As previously described, a plurality of training digital images 210 are used to train the neural network 208. In one example, a dataset is obtained that includes a collection of vector graphics, e.g., 500 outlines. A training digital image generation module 302 is then used to receive user inputs that are used to plot locations of color handles with respect to the vector graphics, e.g., via a user interface. These are then jittered by the training digital image generation module 302 automatically and without user intervention by translating the vector graphics along with respective color handles to expand the collection of training digital images 304 and ground truth color handles 306 usable for training, e.g., to three thousand training digital images 210.

The training digital images 304 are then rasterized in grayscale by the training digital image generation module 302, and thus serve as the outline geometry of path "A" as described above. The ground truth color handles "B" 306 are created by the training digital image generation module 302 by convolving Gaussian filters with white patches at the locations of the user inputs on a black background in the illustrated example. Further, an alpha mask 308 is also used as part of training with the training digital images 304 as an input channel, so as to train the neural network 208 to ignore a background of the training digital images 210.

FIG. 4 depicts an example 400 showing color handle locations 402 extracted from the ground truth digital images and the generated digital image 404. Varying intensity illustrated as a brightness/size of the respective color handles indicates an amount of confidence that corresponds in generating respective color handles by the neural network 208. This may be used to control a density of color handles within a portion of the digital image, e.g., with respect to a threshold to filter out color handles that do not have an amount of confidence by at least a threshold amount.

Returning again to FIG. 2, the training digital images 210, as generated by the training digital image generation module 302 (block 502), are received by a generative adversarial network 202 (block 504). For each training digital image 210, the neural network 208 of the generator module 204 generates a candidate color handle 212, e.g., based on an outline indicated by an alpha mask. The candidate color handle 212 defines a color gradient with respect to the outline in this example within the training digital image 210 (block 506).

The candidate color handle 212 is then passed from the generator module 204 of the discriminator module 206. The discriminator module of the GAN system compares the candidate color handle 212 with the ground truth color handle 214 using a loss function 216 as part of machine learning (block 508), and uses a result of this comparison to train the neural network 208 of the generator module 204 (block 510).

A variety of loss functions may be employed, examples of which include pixel loss, adversarial loss, and perceptual loss. Pixel loss ($L_{pix}$) is the average per-pixel $L_2$ norm of a difference between the candidate color handle 212 and the ground truth color handle 214, e.g., between differences in digital images that include the respective handles.

The generator module 204 "$G_\theta$" is jointly trained with the discriminator module 206 "$D_\varphi$" as previously described. The discriminator module 206 tries to distinguish between the candidate color handle 212 and ground truth color handles 214. The generator module 204, on the other hand, tries to fool the discriminator module 206 into thinking the candidate color handle 212 is real. In an implementation, Wasserstein Loss is used as part of the loss function 216 as it exhibits stable training and faster convergence over other techniques, an example optimization function of which is included below:

$$W(\theta_D, \theta_G) = E_{z \sim P_z} D(G(z;\theta_G);\theta_D) - E_{x \sim P_{data}} D(x;\theta_D)$$

The discriminator module 206 is configured to maximize the above expression with respect to "$\theta_D$" and the generator module 204, at the same time, minimizes the optimization function "$\theta_G$." In practice, both optimization tasks are performed simultaneously by alternating between the steps of the two optimizers.

Perceptual loss ($L_p$) may also be employed as part of the loss function 216. Perceptual loss $L_p$ is defined as an $L_2$ difference (least square errors) in a feature space, where a feature is extracted from a respective layer of a pre-trained neural network representing high level information of images. In an implementation, features extracted from a VGG net-19 are used for this from layers 2, 7 and 12. Further, exponential linear unit (ELU) is used instead of rectified linear unit (ReLU) as an activation function, layer normalization is used instead of batch normalization, and bilinear upsampling layers are used instead of strided convolutions to remove noise from the ground truth color handles 214 by the generative adversarial network 202. In this way, the neural network 208 may be trained for accurate location of color handles through use of back-and-forth communication between the generator module 204 and the discriminator module 206 of the GAN 202. Once trained, the neural network 208 may then be used to generate color gradients based on a digital image as further described in the following section.

Color Gradient Generation

Figure 6:
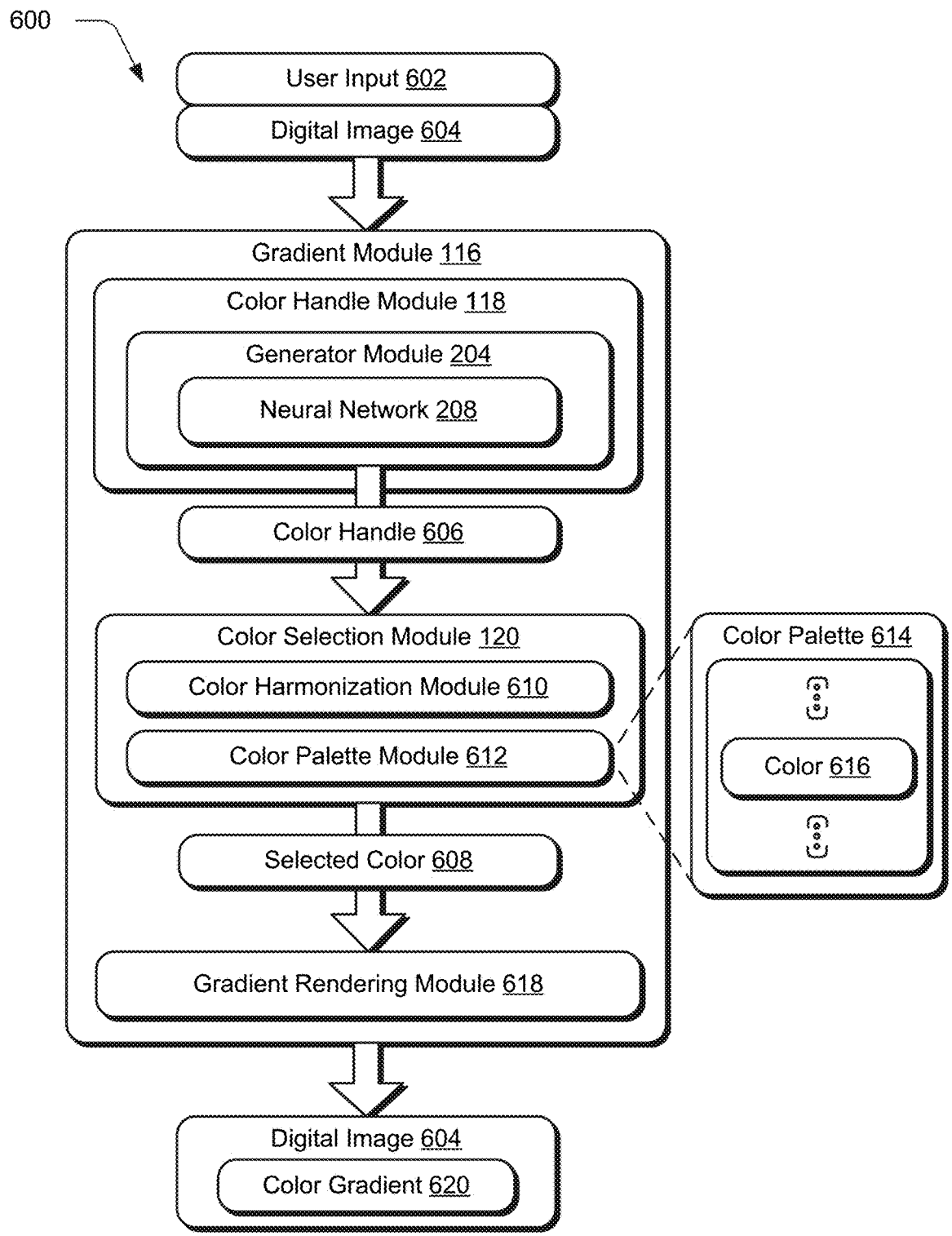
FIG. 6 depicts a system in an example implementation showing use of the neural network trained by the GAN of FIG. 2 to generate a color gradient based on a digital image.
Figure 7:
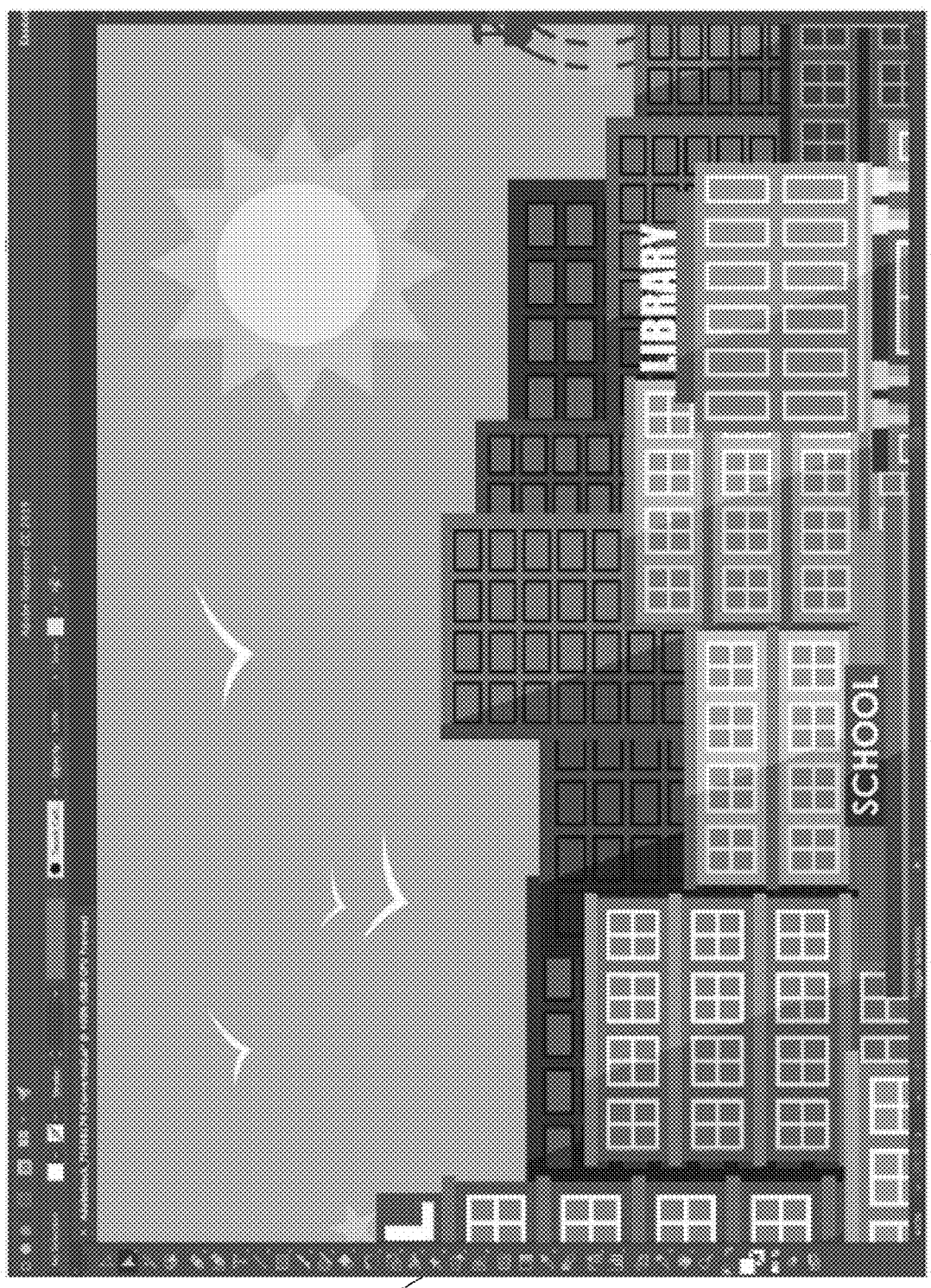
FIG. 7 depicts an example of the digital image of FIG. 6.
Figure 8:
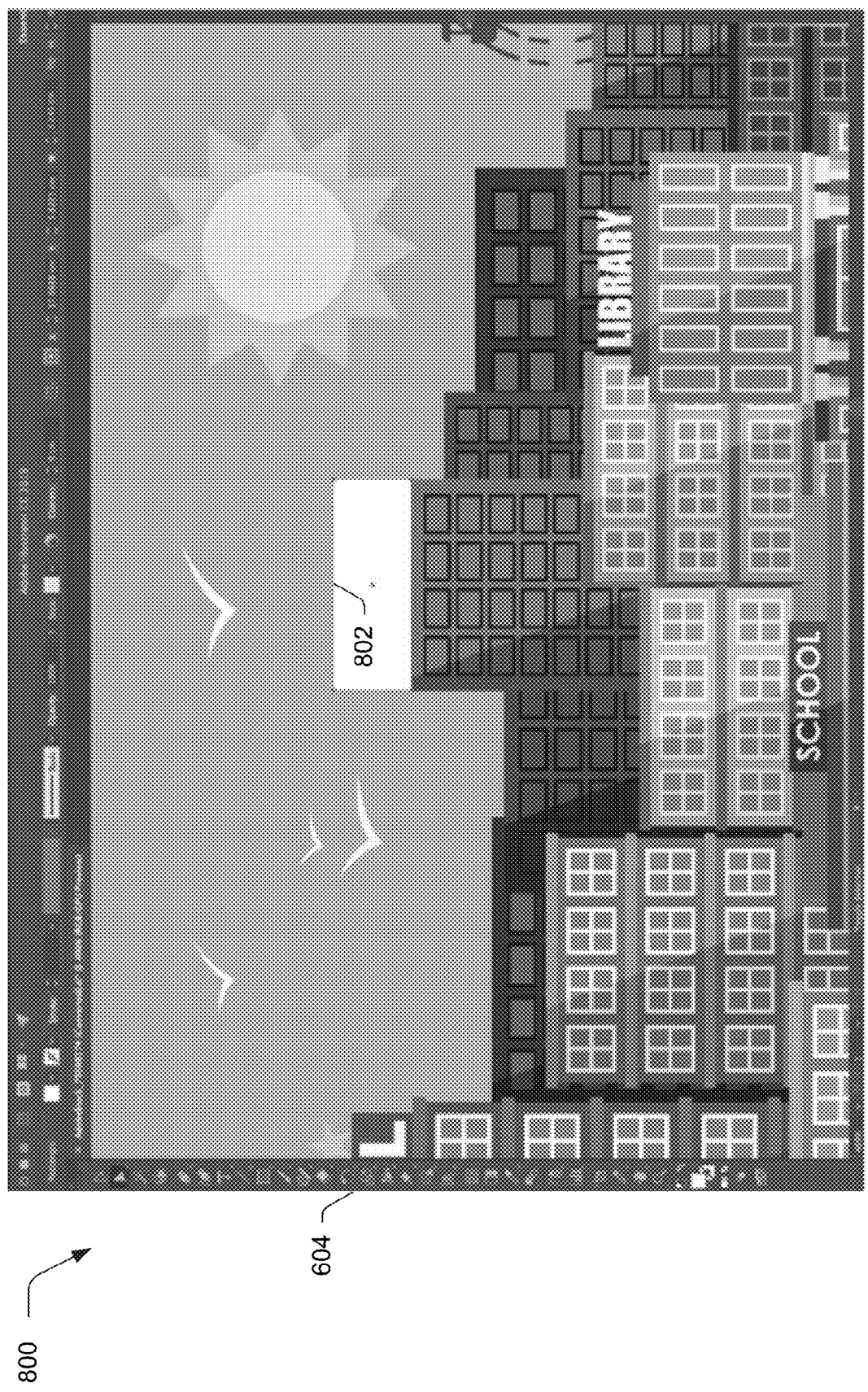
FIG. 8 depicts an example of a user input specifying a portion of the digital image of FIG. 7.
Figure 9:
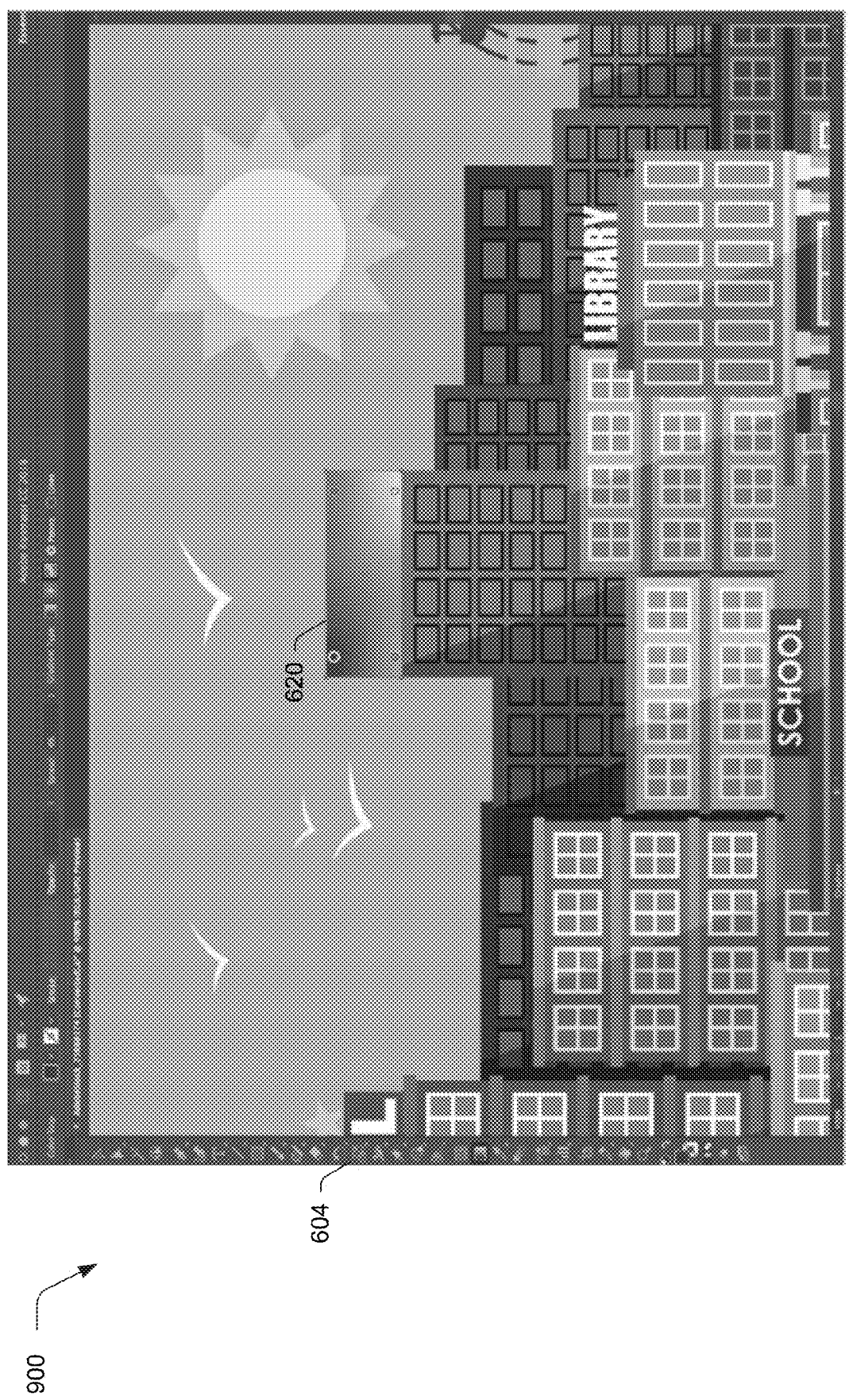
FIG. 9 depicts an example of a color gradient rendered by the system of FIG. 7 for the portion of FIG. 8.
Figure 10:
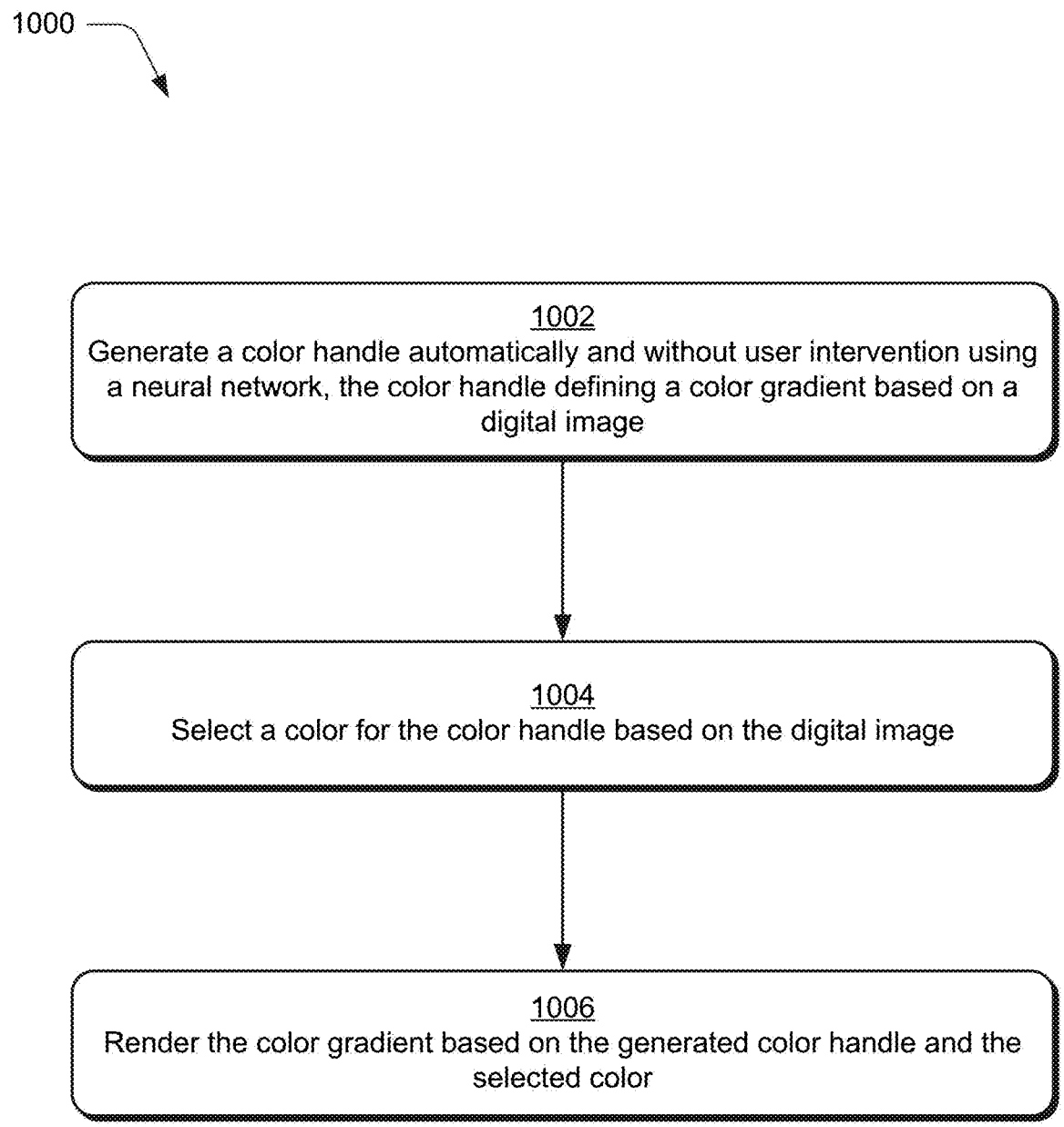
FIG. 10 is a flow diagram depicting a procedure in an example implementation in which a color handle is generated by a neural network and used to select a color to render a color gradient.

FIG. 6 depicts a system 600 in an example implementation showing use of the neural network 208 trained by the GAN 202 of FIG. 2 to generate a color gradient based on a digital image. FIG. 7 depicts an example 700 of the digital image of FIG. 6. FIG. 8 depicts an example 800 of a user input specifying a portion of the digital image of FIG. 7. FIG. 9 depicts an example 900 of a color gradient rendered by the system 600 of FIG. 7 for the portion of FIG. 8. FIG. 10 depicts a procedure 1000 in an example implementation in which a color handle is generated by a neural network 208 of a color handle module of FIG. 1, used to select a color by a color selection module 120, and then a color gradient is rendered based on the color handle and selected color.

The following discussion describes techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to FIGS. 6-10.

The neural network 208 of the generator module 204 trained in the previous section is used as part of generating a color gradient based on a digital image, automatically and without user intervention by a gradient module 116. To begin in this example, a user input 602 is received that specifies a portion of a digital image 604, e.g., a "path" within the digital image 604.

FIG. 7, for instance, depicts an example 700 of the digital image 604 of FIG. 6 as rendered in a user interface. As illustrated, the digital image 604 includes a variety of different vector graphics (e.g., artwork) that include a variety of different colors and color gradients. The user input 602 is received via interaction with a user interface of FIG. 8 specifies a portion 802 (and corresponding path defined by an outer border of the portion) within the digital image 604 that is to be colored using a color gradient. The portion 802, for instance, may be defined via the user input 702 through use of a bounding box, a freeform line, selection of a shape, and so forth.

In response, the generator module 204 employs the neural network 208 to generate a color handle 606 automatically and without user intervention. The color handle 606 defines a color gradient based on the digital image 604 (block 1002), e.g., based on a mesh using weights assigned to vertices based on the color handle. The neural network 208, for instance, may generate one or more color handles 606 similar to how candidate color handles 212 are generated as part of training as described in the previous section. This may include, for instance, location of color handles within the portion 802 based on an outline geometry of a path defined by an outer border of the portion 802. This portion 802 may be located within the digital image 604 as depicted in FIG. 8, outside the digital image as shown in FIG. 1, and so forth.

The generated color handle 606 is then passed from the color handle module 118 to the color selection module 120. The color selection module 120 is used to select a color 608 for the color handle based on the digital image 604 (block 1004). To do so, the color selection module 120 generates the selected color 608 based on colors included in the digital image 604.

In one example, a color harmonization module 610 selects colors sampled using color harmonization. Color harmonization may be used, for instance, in an instance in which a single object (e.g., vector graphic) is being colored in the digital image 604. An example of color harmonization is described in Daniel Cohen-Or, Olga Sorkine, Ran Gal, Tommer Leyvand, and Ying-Qing Xu. Color harmonization. *ACM Trans. Graph.*, 25(3):624-630, July 2006, which is hereby incorporated by reference in its entirety.

In another example in which a plurality of objects (e.g., vector graphics, artworks) are included in the digital image 604, a color palette module 612 is employed to generate a color palette 614 based on colors 616 sampled from the digital image 604. The color palette module 612, for instance, may rasterize each object included in the digital image 604, except the portion 802 the color gradient is to be applied. The color palette 614 with "n" colors is generated (where "n" is a number of color handles 606 generated by the color handle module 118), e.g., using K-means clustering. These colors may also be harmonized by the color harmonization module 610 as described above.

The colors 616 of the color palette 614 in this example are then used as a basis to generate the selected color 608 for the color handle 606. The color selection module 120, for instance, may analyze objects (e.g., vector graphics) disposed in a neighborhood of the portion of the digital image 604, e.g., the input path. In one example, colors applied on neighboring objects are gathered by the color selection module 120. In cases where shading in the form of a gradient mesh is applied (e.g., for linear, radial, or freeform color gradients), colors are sampled by the color selection module 120 from these constructs, e.g., color stops, mesh vertices, and so forth. The color palette 614 is then generated from the accumulated colors by the color palette module 612 using K-means clustering, in which "K" is set to the number of color handles generated by the neural network 208 of the color handle module 118.

This results in a color palette 614 having "K" clusters from the accumulated colors 616 and the centroids of theses clusters that are visually in harmony with other objects in the digital image 604. The color handles 606 (e.g., locations of the color handles 606) and selected colors 608 are then passed to a gradient rendering module 618 to render the color gradient 620 based on the digital image 604 (block 1006), e.g., in real time as the user input specifying the portion 802 is received. The gradient rendering module 618, for instance, may apply heuristics based on gravity of colors and locality of reference to assign color to each color handle. This technique promotes that similar colors appear together and that darker colors tend to cluster at the bottom while lighter colors tend towards the top of the artwork, respectively. An example of rendering of the color gradient 620 in the portion 802 of the digital image is depicted in the example 800 of FIG. 9.

In this way, the techniques described herein eliminate the learning curve associated with manual plotting of color handles in order to generate color gradients, thereby increasing the usability of the feature even for new users. The training can be augmented based on continued user interaction, thereby improving the quality and personalization of results generated by the neural network. The selected colors are in harmony with the colors used in the digital image and therefore provides a meaningful entry point to use of an image editing tool that employs these techniques.

Example System and Device

Figure 11:
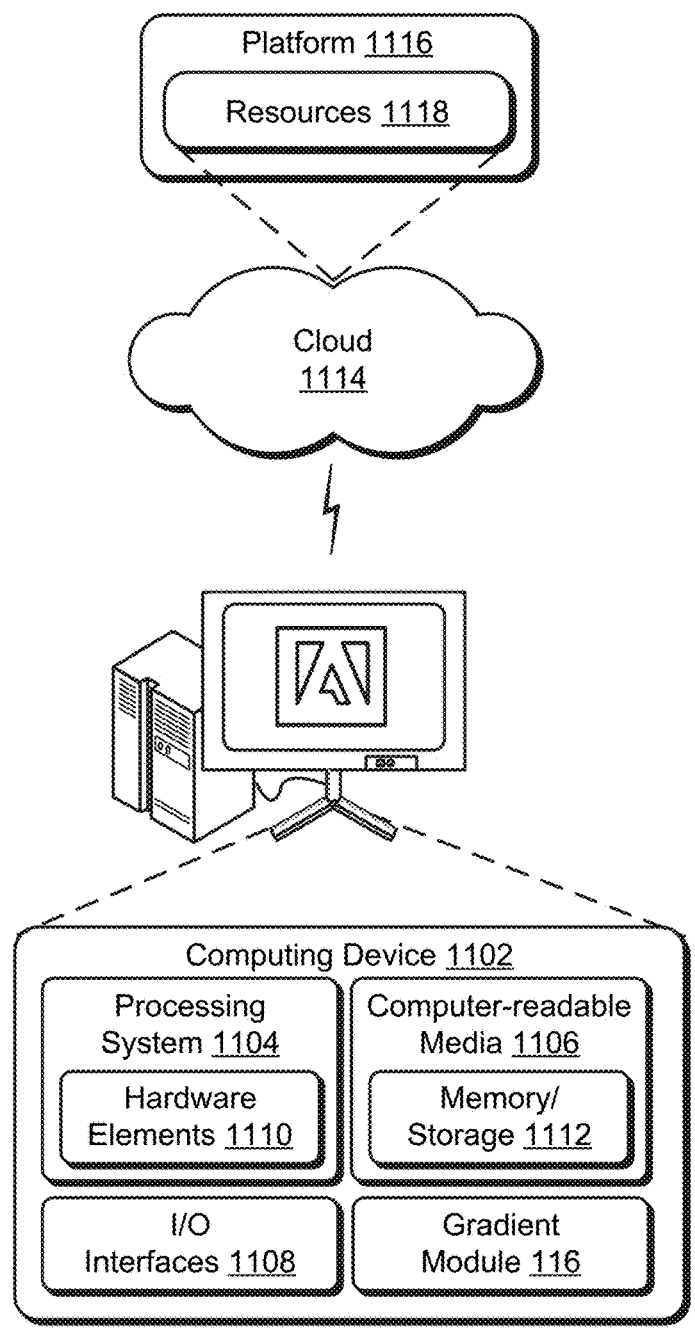
FIG. 11 illustrates an example system including various components of an example device that can be implemented as any type of computing device as described and/or utilize with reference to FIGS. 1-10 to implement embodiments of the techniques described herein.

FIG. 11 illustrates an example system generally at 1100 that includes an example computing device 1102 that is representative of one or more computing systems and/or devices that may implement the various techniques described herein. This is illustrated through inclusion of the gradient module 116. The computing device 1102 may be, for example, a server of a service provider, a device associated with a client (e.g., a client device), an on-chip system, and/or any other suitable computing device or computing system.

The example computing device 1102 as illustrated includes a processing system 1104, one or more computer-readable media 1106, and one or more I/O interface 1108 that are communicatively coupled, one to another. Although not shown, the computing device 1102 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1104 is representative of functionality to perform one or more operations using hardware. Accordingly, the processing system 1104 is illustrated as including hardware element 1110 that may be configured as processors, functional blocks, and so forth. This may include implementation in hardware as an application specific integrated circuit or other logic device formed using one or more semiconductors. The hardware elements 1110 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1106 is illustrated as including memory/storage 1112. The memory/storage 1112 represents memory/storage capacity associated with one or more computer-readable media. The memory/storage component 1112 may include volatile media (such as random access memory (RAM)) and/or nonvolatile media (such as read only memory (ROM), Flash memory, optical disks, magnetic disks, and so forth). The memory/storage component 1112 may include fixed media (e.g., RAM, ROM, a fixed hard drive, and so on) as well as removable media (e.g., Flash memory, a removable hard drive, an optical disc, and so forth). The computer-readable media 1106 may be configured in a variety of other ways as further described below.

Input/output interface(s) 1108 are representative of functionality to allow a user to enter commands and information to computing device 1102, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1102 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1102. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1102, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1110 and computer-readable media 1106 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1110. The computing device 1102 may be configured to implement particular instructions and/or functions corresponding to the software and/or hardware modules. Accordingly, implementation of a module that is executable by the computing device 1102 as software may be achieved at least partially in hardware, e.g., through use of computer-readable storage media and/or hardware elements 1110 of the processing system 1104. The instructions and/or functions may be executable/operable by one or more articles of manufacture (for example, one or more computing devices 1102 and/or processing systems 1104) to implement techniques, modules, and examples described herein.

The techniques described herein may be supported by various configurations of the computing device 1102 and are not limited to the specific examples of the techniques described herein. This functionality may also be implemented all or in part through use of a distributed system, such as over a "cloud" 1114 via a platform 1116 as described below.

The cloud 1114 includes and/or is representative of a platform 1116 for resources 1118. The platform 1116 abstracts underlying functionality of hardware (e.g., servers) and software resources of the cloud 1114. The resources 1118 may include applications and/or data that can be utilized while computer processing is executed on servers that are remote from the computing device 1102. Resources 1118 can also include services provided over the Internet and/or through a subscriber network, such as a cellular or Wi-Fi network.

The platform 1116 may abstract resources and functions to connect the computing device 1102 with other computing devices. The platform 1116 may also serve to abstract scaling of resources to provide a corresponding level of scale to encountered demand for the resources 1118 that are implemented via the platform 1116. Accordingly, in an interconnected device embodiment, implementation of functionality described herein may be distributed throughout the system 1100. For example, the functionality may be implemented in part on the computing device 1102 as well as via the platform 1116 that abstracts the functionality of the cloud 1114.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment, a method implemented by at least one computing device, the method comprising:
   receiving, by a generative adversarial network (GAN) of the at least one computing device, a training digital image and a ground truth color handle that defines a color gradient within the training digital image;
   generating, by the at least one computing device, a candidate color handle that defines a color gradient based on the training digital image by a generator module of the GAN;
   comparing, by the at least one computing device, the candidate color handle with the ground truth color handle using a loss function as part of machine learning by a discriminator module of the GAN; and
   training, by the at least one computing device, the generator module using a result of the comparing from the discriminator module using the loss function.

2. The method as described in claim 1, wherein the color handle defines the color gradient based on a location and weights from the location specifying respective amounts of a color using a mesh.

3. The method as described in claim 1, wherein the generating of the candidate color handle of the generator module uses a neural network and the training includes training the neural network.

4. The method as described in claim 1, wherein the loss function includes a pixel loss as an average per pixel loss between a candidate digital image having the candidate color handle and the training digital image having the ground truth color handle.

5. The method as described in claim 1, wherein the loss function includes a Wasserstein loss.

6. The method as described in claim 1, wherein the loss function includes a perceptual loss as a least square errors in a feature space.

7. The method as described in claim 1, further comprising generating a plurality of said training digital images by jittering an object and corresponding color handle in a digital image.

8. The method as described in claim 1, wherein the training digital image includes an alpha mask defining a portion of the training digital image, to which, the color gradient of the candidate color handle is to be applied.

9. In a digital medium environment, a system comprising:
   a color handle module implemented at least partially in hardware of a computing device to generate a color handle automatically and without user intervention using a neural network, the color handle defining a color gradient based on a digital image;
   a color selection module implemented at least partially in hardware of the computing device to select a color for the color handle based on the digital image; and
   a gradient rendering module implemented at least partially in hardware of the computing device to render the color gradient based on the generated color handle and the selected color.

10. The system as described in claim 9, wherein the color handle defines the color gradient based on a location and weights from the location specifying respective amounts of a color using a mesh.

11. The system as described in claim 9, further comprising a generative adversarial network implemented at least partially in hardware of the computing device to train the neural network to generate the color handle.

12. The system as described in claim 11, wherein the neural network is included as part of a generator module of the generative adversarial network and is trained, at least in part, using a loss function of a discriminator module of the generative adversarial network.

13. The system as described in claim 9, wherein the color selection module selects the color from colors sampled from the digital image using color harmonization.

14. The system as described in claim 9, wherein the color selection module selects the color from colors sampled from the digital image by rasterizing the digital image and generating a color palette.

15. The system as described in claim 9, wherein the gradient rendering module is configured to change a location of the generated color handle responsive to a user input received via a user interface, via which, the digital image is rendered.

16. The system as described in claim 9, wherein the color handle generation module is configured to receive a user input specifying a portion of the digital image and then generate the color handle based on the portion of the digital image indicated via the user input.

17. In a digital medium environment, a system comprising:
   means for generating a candidate color handle that defines a color gradient based on a training digital image and a ground truth color handle that defines a color gradient within the training digital image; and
   means for training the generating means using machine learning based on a result of comparing the candidate color handle with the ground truth color handle of the training digital image using a loss function as part of machine learning.

18. The system as described in claim 17, wherein the candidate color handle defines the color gradient based on a location and weights from the location specifying respective amounts of a color using a mesh.

19. The system as described in claim 17, wherein the loss function includes:
   a pixel loss as an average per pixel loss between a candidate digital image having the candidate color handle and the training digital image having the ground truth color handle;
   a Wasserstein loss; or
   a perceptual loss as a least square errors in a feature space.

20. The system as described in claim 17, wherein the generating means and the training means are part of a generative adversarial network.

* * * * *